United States Patent [19]

Teruyuki et al.

[11] Patent Number: 4,560,109
[45] Date of Patent: Dec. 24, 1985

[54] SHAFT SEALING DEVICE FOR SLIDING PORTION OF NEEDLE VALVE IN PAINT SPRAY GUN

[75] Inventors: Ohba Teruyuki, Yokohama; Arai Kazuo; Yahagi Atushi, both of Tokyo; Iwakoshi Shigeru, Yokohama, all of Japan

[73] Assignee: Iwata Air Compressor Mfg. Co., Ltd., Tokyo, Japan

[21] Appl. No.: 506,193

[22] Filed: Jun. 20, 1983

[30] Foreign Application Priority Data

Jun. 29, 1982 [JP] Japan ................... 57-112419

[51] Int. Cl.[4] .................................................. B05B 1/30
[52] U.S. Cl. .................................. 239/583; 239/526; 251/214; 277/121
[58] Field of Search .............. 239/525, 526, 527, 528, 239/583; 277/117–122, 190–191; 251/214

[56] References Cited

U.S. PATENT DOCUMENTS

| 786,976 | 4/1905 | Law | 277/120 |
|---|---|---|---|
| 2,864,649 | 12/1958 | Adams | 239/526 |
| 3,101,955 | 8/1963 | Olson | 277/120 |
| 3,284,089 | 11/1966 | Wrenshall | 251/214 |
| 3,380,705 | 4/1968 | Enssle | 239/583 |
| 3,675,895 | 7/1972 | Matousek | 251/214 |
| 4,166,579 | 9/1979 | Beise et al. | 239/526 |
| 4,410,189 | 10/1983 | Myers et al. | 277/117 |

Primary Examiner—Jeffrey V. Nase
Assistant Examiner—Michael J. Forman
Attorney, Agent, or Firm—Wenderoth, Lind & Ponack

[57] ABSTRACT

A shaft sealing device is disposed on the sliding portion of a needle valve stem in a spray gun for spraying a compressed fluid (paints), particularly in an airless paint spray gun, and is capable of enhancing the durability of the portion to be sealed. The shaft sealing device comprises a main packing for the needle valve which permits the needle valve stem to be pierced therethrough and slid in the center thereof. The shaft sealing device has a concave portion formed therein in the axial direction, a ring-shaped auxiliary packing of an elastic rubber body fitted in the concave portion, a packing rest provided with a convex portion, and a packing gland for tightening the main packing from behind. The packing gland tightens the ring-shaped auxiliary packing which is elastically deformed. The elastic deformation of the auxiliary packing extends to the main packing, whereby the needle valve stem can be uniformly sealed with the main packing and stable durability can be obtained even by a small tightening force.

1 Claim, 8 Drawing Figures

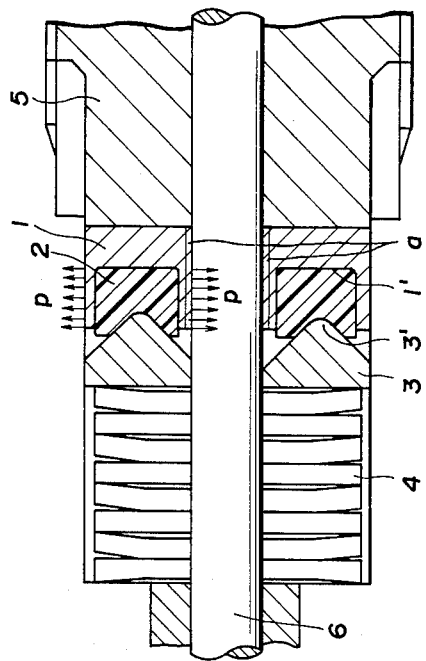
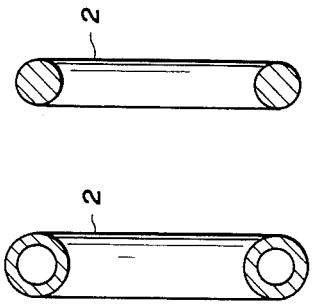
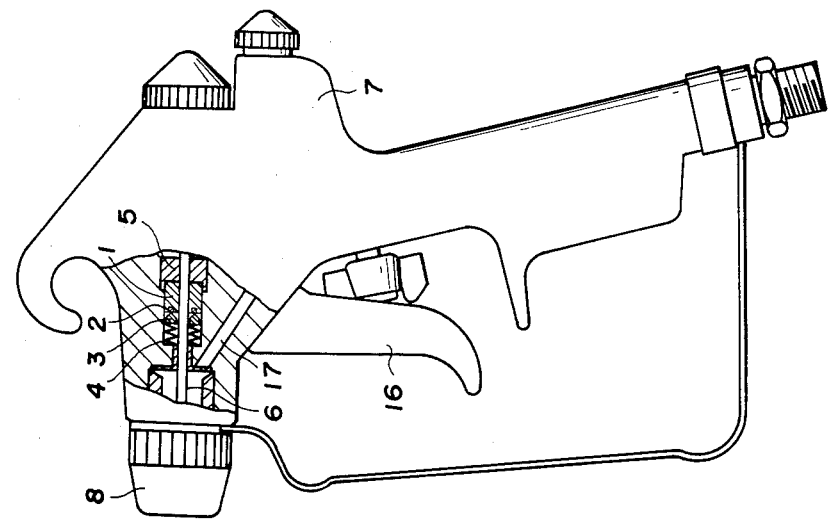

SHAFT SEALING DEVICE FOR SLIDING PORTION OF NEEDLE VALVE IN PAINT SPRAY GUN

BACKGROUND OF THE INVENTION

1. Field of the Invention

The present invention relates to a shaft sealing device for the sliding portion of a needle valve stem for use in a spray gun for painting, particularly in an airless paint spray gun for spraying compressed paints. More specifically, the present invention relates to a shaft sealing device capable of enhancing the sealing effect by inserting an auxiliary packing made of an elastic rubber body into a main packing for a needle valve having its stem pierced through the central portion of the main packing, tightening the auxiliary packing to thereby tighten the main packing, and protecting the sliding portion of the needle valve stem from a compressed fluid.

2. Description of the Prior Art

There have heretofore been proposed various paint spray guns such as in U.S. Pat. No. 3,000,576, U.S. Pat. No. 3,116,020, and Japanese Patent Publication No. SHO 54(1979)-7822. However, none of these citations specifically disclose in detail sealing means for the sliding portion of a needle valve used in a spray gun. In view of the necessity to compare the prior art with the sealing device of the present invention, therefore, a typical conventional sealing means of this kind will be described hereinafter with reference to an enlarged cross-sectional view of the prior art shown in FIG. 1. The conventional sealing means comprises, as shown, a packing 10 having a substantially V-shaped cross section, a packing rest 12 inserted into the substantially V-shaped groove in the packing 10, a belleville spring 13 for urging the packing rest 12 toward the bottom of the groove, and a packing gland 14 for pushing the packing 10 from behind 10, tightening the packing and thereby sealing the sliding portion of a needle valve stem 15.

In the case of this sealing means, when the packing 10 is worn off in the amount of a in consequence of repeated sliding reciprocation of the needle valve stem 15 used for a long period of time, it is necessary to further tighten the packing by use of the packing gland 14 to thereby supplement the aforementioned amount a in order to obtain a tight seal. However, since the non-sliding portion b is not worn away, the packing gland 14 collides against the surface of the non-sliding portion and cannot further tighten the packing 10 and, as a result, a tight seal cannot be obtained. Thus, this sealing means has a drawback that it is inferior in durability.

In order to eliminate the aforementioned drawback with the construction described above, precise processing tolerance is required. In other words, slight processing errors greatly affect the durability of a sealing means. To be more specific, in a case where the packing 10 comes into collision with the packing rest 12 not at the inner circumferential surface d shown in FIG. 2(A) but at the outer circumferential surface c alone due to the processing errors, as illustrated in FIG. 2(A), the surface pressure p becomes large relative to the outer circumferential surface c and small relative to the inner circumferential surface d, with the result that there gives rise to an incomplete seal. Even when the packing 10 is tightened by the packing gland 14 until the outer circumference of the groove of the packing 10 is elastically deformed so that the inner surface may be sealed up, wear of the sliding portion causes the packing gland 14 to collide against the surface of the non-sliding portion as described above and consequently causes the packing gland 14 to be prevented from moving forward, with the result that a complete seal cannnot be obtained.

In the case where the packing 10 has its leading end e coming into collision with the packing rest 12, as shown in FIG. 2(B), the surface pressure p becomes locally high. This brings about disadvantages that the needle vlave stem 15 is interrupted in its return stroke, that the local portion on which high surface pressure p is exerted is relatively rapidly worn off, and consequently that the durability becomes inferior.

Further, the belleville spring 13 is required to have its spring force large enough to endure the tightening force of the packing gland 14 relative to the packing 10 and, at the same time, a large tightening force is required in tightening the packing 10 against the large spring force. When the packing 10 is made of a material which is easily deformable, such as leather, temporarily complete seal can be obtained by the deformation of the packing material, whereas the packing material cannot maintain its suitable size and shape intact and consequently cannot be used for a long period of time. Particularly when packing leather is used as a packing material, it absorbs water and a solvent to become hardened.

SUMMARY OF THE INVENTION

In view of the state of the prior art as described above, the present invention has been accomplished and allows the packing for a needle valve to be tightened by inserting an auxiliary packing composed of an elastic body, such as rubber etc., into the packing for the needle valve and then by tightening the auxiliary packing.

One object of the present invention is to provide a shaft sealing device capable of enhancing the durability of the sliding portion of a needle valve stem to be sealed for preventing leakage of a compressed fluid (paints), stabilizing the quality thereof, easily adjusting the assemblage thereof, and obtaining excellent sealing effect at a low cost.

Another object of the present invention is to provide a shaft sealing device capable of easily tightening the sliding and stationary sides by use of a single part when the sliding side is worn off to lower the sealing effect.

To attain the objects described above, according to the present invention, there is provided a shaft sealing device which comprises an annular main packing having a concave portion formed therein, an auxiliary packing having rubber elasticity and being fitted in the concave portion, and a packing rest for pressing the auxiliary packing.

The aforementioned and other objects and characteristic features of the present invention will become apparent from the description to be given hereinbelow with reference to the accompanying drawings.

BRIEF DESCRIPTION OF THE DRAWINGS

FIGS. 3 and 6 are, respectively, a partially cutaway cross section of a spray gun and a longitudinal cross section of another spray gun, which spray guns are provided with the shaft sealing device according to the present invention.

FIG. 4 is an enlarged cross section illustrating the shaft sealing device according to the present invention.

FIGS. 5(A) and 5(B) are enlarged cross sections illustrating embodiments of the auxiliary packing usable in the present invention.

DESCRIPTION OF THE PREFERRED EMBODIMENT

The shaft sealing device for the sliding portion of a needle valve used in a paint spray gun according to the present invention will now be described in detail with reference to the accompanying drawings.

Figure 6:
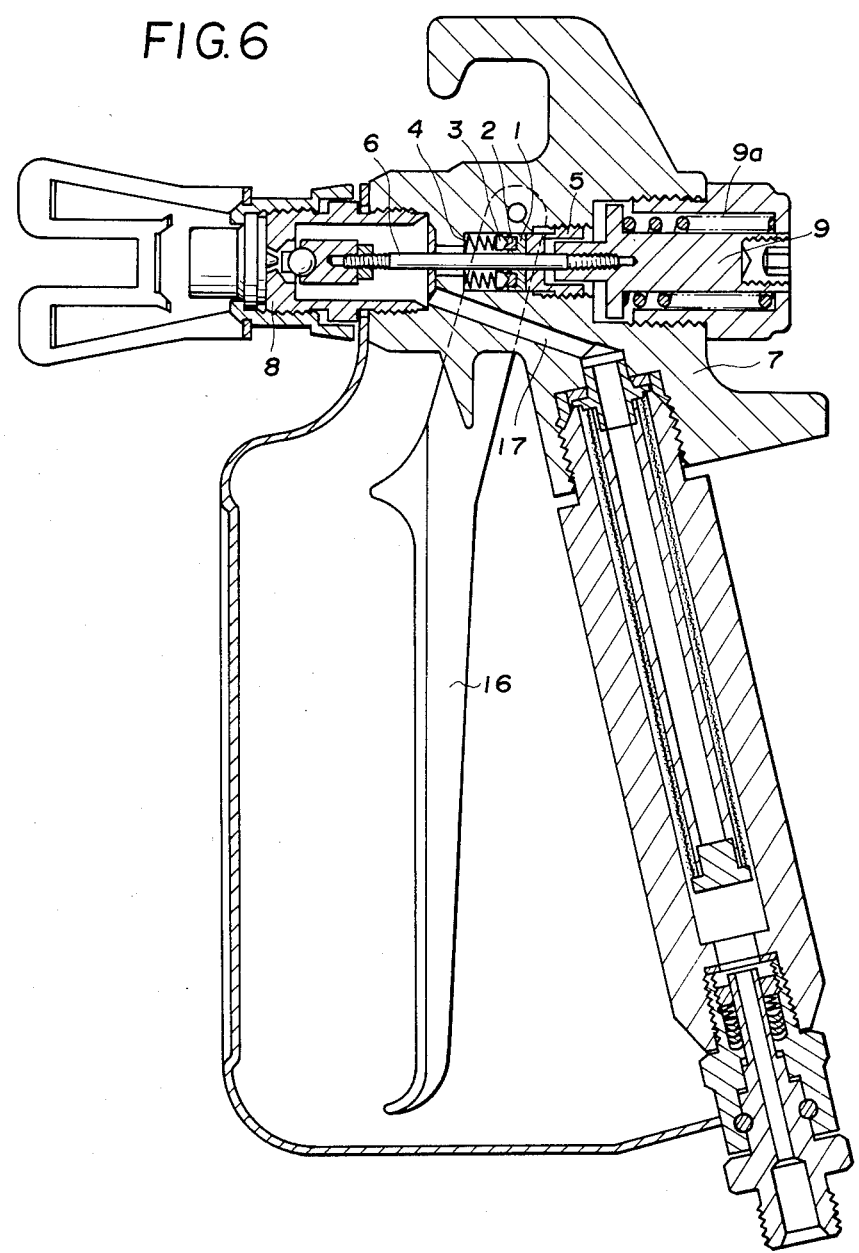

FIGS. 3 and 6 are, respectively as indicated above, a partially cutaway cross section and a longitudinal cross section of spray guns each provided with the shaft sealing device according to the present invention. FIG. 4 is an enlarged cross section illustrating the shaft sealing device according to the present invention. In FIG. 3, an annular main packing 1 for a needle valve has a concave flat portion 1' (FIG. 4) formed therein in the axial direction. A ring-shaped auxiliary packing 2 is made of rubber and fitted in the concave portion 1' in the main packing 1. A packing rest 3 is provided with a convex portion 3' which is pressed against the auxiliary packing 2 by a belleville spring 4. A packing gland 5 is provided for further tightening the main packing 1 from behind the main packing 1. Through the central portions of the main packing 1, packing rest 3, belleville spring 4 and packing gland 5, there is pierced a needle valve stem 6 which is slidable in both the rightward and the leftward direction in FIG. 4. The main packing 1 seals the valve stem between the high-pressure side on the left side in FIG. 4 and the low-pressure side on the right side in FIG. 4 and prevents a compressed fluid from leaking to the low-pressure side. In FIGS. 3 and 6, there is illustrated a spray gun body 7, a paint spraying nozzle 8 attached to the leading end of the spray gun body 7, a needle valve set 9, a spring 9a for energizing the needle valve, a trigger 16 for the needle valve stem 6, and a passageway 17 for paints.

The main packing 1 is preferably made of a material having solvent resistance and exhibiting a low coefficient of friction and a low resistance coefficient, such as a tetrafluorinated resin (e.g. polytetrafluoroethylene). As for the materials of which the auxiliary packing 2 to be fitted in the concave portion 1' in the main packing 1 is made, there are included natural rubber, nitrile rubber, fluorine rubber, silicone rubber, Thiokol ® brand rubber, chloroprene rubber, urethane rubber, etc. The auxiliary packing 2 is used in the form of an elastic rubber body and is indispensably required to be elastically deformable. The auxiliary packing 2 is a ring-shaped elastic rubber body as described above and has a shape such as that of a hollow tubular ring shown in FIG. 5(A), or of a circular rod-shaped ring shown in FIG. 5(B). The shape of the auxiliary packing 2 should not be limited to those shown in FIGS. 5(A) and 5(B).

The function of the shaft sealing device according to the present invention will be discussed with reference to the construction thereof as described above. As shown in FIG. 4, when the main packing 1 having the auxiliary packing 2 of an elastic rubber body fitted in the concave portion 1' thereof is tightened by the packing gland 5 against the convex portion 3' of the packing rest 3 energized under constant load by the belleville spring 4, the auxiliary packing 2 fitted in the concave portion 1' of the main packing 1 is pressed against the convex portion 3' of the packing rest 3, compressed, and elastically deformed. At the same time, the auxiliary packing 2 applies surface pressure p to the inner and outer circumferential surfaces of the portion of the main packing 1 forming therein the concave portion 1', as illustrated in FIG. 4, with the result that the needle valve stem 6 piercing through the main packing is uniformly sealed with the main packing 1.

As is widely known to those persons skilled in the art, rubber is made from ultra-high viscous fluids and, when compressed in a sealed space, exhibits uniform pressure throughout the entire body thereof. That is to say, the elastic rubber body constituting the auxiliary packing 2 fitted in the concave portion 1' serves to uniformly press the main packing 1 by being pressed by the convex portion 3' of the packing rest 3.

In the case where the needle valve stem 6 is slid in the main packing 1 during its use to wear off the main packing 1 in the amount a, the packing gland 5 is caused to further tighten the main packing 1. As a result, the sealing effect can completely be maintained because the auxiliary packing 2 uniformly presses the main packing 1 against the circumference of the needle valve stem 6 at all times.

Figure 1:
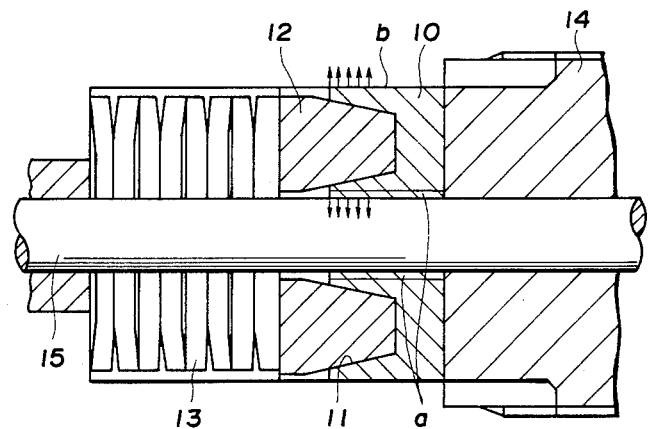
FIGS. 1, 2(A) and 2(B) are enlarged, sectioned, explanatory views showing conventional sealing devices.
Figure 2A:
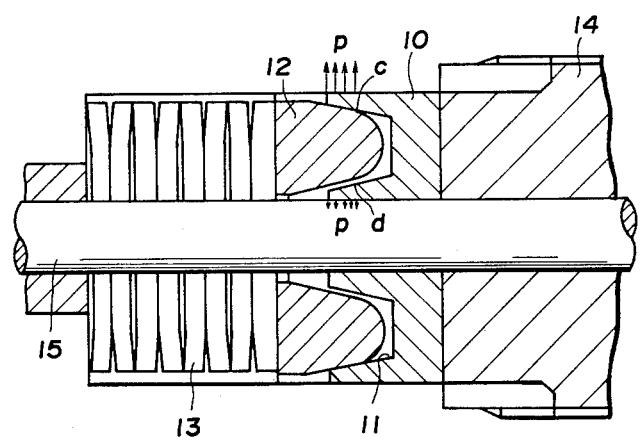
Figure 2B:
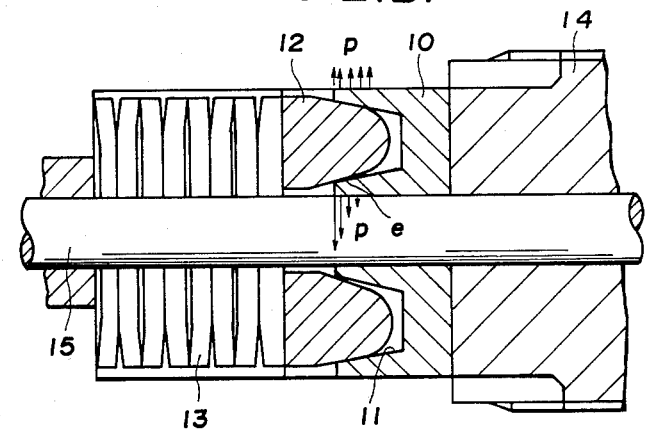

As described above, the present invention adopts the construction which comprises forming the concave portion 1' in the main packing 1 for the needle valve, fitting the auxiliary packing 2 of an elastic rubber body in the concave portion 1, tightening the auxiliary packing 2 to be elastically deformed, and allowing the elastic deformation to be exerted onto the main packing 1 to thereby seal the needle valve stem 6 with the main packing 1. Thus, the sealing effect can be obtained under a uniform force. In the conventional sealing device shown in FIG. 1, since the tapered portions both of the packing 10 and of the packing rest 12 are brought into collision with each other, unevenness of processing of packings 10 and packing rests 12 is apt to occur and is a great cause of lowering the durability of the sealing device. Contrary to this prior art device, since the present invention is required only to form a concave flat portion 1' in a main packing 1, it is advantageous in that the packing 1 can easily be processed into a desired shape, thereby reducing occurrence of processing unevenness. If processing unevenness should occur, it little affects the durability of the sealing device because uniform rubber pressure of the auxiliary packing 2 fitted in the concave portion 1' is applied to the main packing 1. It has been confirmed that the service life of the conventional sealing device terminates after 300,000 to 400,000 open-shut strokes of the needle valve stem 6, whereas that of the present sealing device does not terminate even after 2,000,000 open-shut strokes of the needle valve stem 6. Therefore, the durability of the present sealing device is more than five times as long as that of the conventional sealing device.

Further, although the conventional packing has been required to be tightened by a large force, a smaller tightening force will suffice in the present invention to prevent leakage of a compressed fluid and obtain stable durability. Even though a large tightening force is exerted on the main packing 1 in the present invention, it will be absorbed by the elastic deformation of the rubber auxiliary packing 2, thereby similarly obtaining stable durability.

Furthermore, when the main packing 1 is worn off by the sliding reciprocation of the needle valve stem 6, since the auxiliary packing 2 uniformly presses the main packing 1 at all times, the sealing effect can be maintained uniformly over a long period of time.

What is claimed is:

1. In a shaft sealing device for preventing paints from leaking out, said shaft sealing device being interposed between a needle valve stem of a spray gun for spraying paints and a body of the spray gun, said shaft sealing device being provided on an outer diameter portion of the needle valve stem, said shaft sealing device further being provided on a sliding portion of the needle valve stem, wherein the improvement of the shaft sealing device comprises:

an annular main packing surrounding the needle valve stem, being in contact with the needle valve stem, and having a concave groove formed on one side, said concave groove being spaced from the needle valve stem;

an annular auxiliary packing having an elastic body, being spaced from the needle valve stem, having one side fitted in the concave groove formed on the one side of the annular main packing;

an annular convex-shaped packing rest being in contact with the needle valve stem and holding said annular auxiliary packing into the concave groove formed in the annular main packing; and belleville spring means, surrounding the needle valve stem, for pressing the annular convex-shaped packing rest into the conical groove formed in the annular auxiliary packing;

wherein said concave groove formed on one side of the annular main packing faces the high pressure side of the shaft sealing device;

wherein said elastic body of the annular auxiliary packing is made of a rubber selected from the group consisting of natural rubber, nitrile rubber, fluorine rubber, silicone rubber, Thiokol ® brand rubber, chloroprene rubber, and urethane rubber; and wherein said annular main packing is made of a resin selected from the group consisting of tetrafluorinated resin and a resin having solvent resistance and exhibiting a low coefficient of frictional resistance.

* * * * *